United States Patent

Smith

[11] Patent Number: 5,163,183
[45] Date of Patent: Nov. 17, 1992

[54] FIREMAN SUIT

[76] Inventor: Peggy V. Smith, Rte. 4, 401-B Linda Dr., Martinsville, Va. 24112

[21] Appl. No.: 801,410

[22] Filed: Dec. 2, 1991

[51] Int. Cl.⁵ ............................................. A41D 13/00
[52] U.S. Cl. ......................................... 2/81; 2/2.1 A; 2/2.1 R; 2/94
[58] Field of Search .................. 2/2, 2.1 A, 2.1 R, 69, 2/79, 81, 93, 94, 96, 227

[56] References Cited

U.S. PATENT DOCUMENTS

| | | | |
|---|---|---|---|
| 237,141 | 2/1881 | Tasker | 2/2.1 R |
| 2,967,305 | 1/1961 | White | 2/2.1 A |
| 3,042,926 | 7/1962 | Shepard | 2/2.1 A |
| 3,405,406 | 10/1968 | Vykukal | 2/2.1 A |
| 3,432,860 | 3/1969 | Durney | 2/2 |
| 3,636,564 | 1/1972 | Vykukal | 2/2.1 A |
| 3,782,614 | 1/1974 | Campisi | 2/94 |
| 4,272,852 | 6/1981 | Bell | 2/94 |
| 4,310,926 | 1/1982 | Maroist | 2/81 |
| 4,604,759 | 8/1986 | Bowman | 2/81 |

FOREIGN PATENT DOCUMENTS 2188226  9/1987  United Kingdom .............. 2/2.1 R

Primary Examiner—Werner H. Schroeder
Assistant Examiner—Diana L. Biefeld
Attorney, Agent, or Firm—Leon Gilden

[57] ABSTRACT

A fireman suit formed as a fire-resistant shell includes a torso portion formed with a medial longitudinally aligned zipper and a rear pleated portion arranged parallel and longitudinally aligned with the zipper directed through a rear surface of the torso portion. Each leg tube includes an accordion pleated leg conduit portion and a groin pleated accordion portion, with each arm tube including an accordion pleated elbow portion medially of each arm. A pouch container is arranged for mounting relative to the forward surface of the torso portion of the suit.

5 Claims, 5 Drawing Sheets

FIREMAN SUIT

BACKGROUND OF THE INVENTION

1. Field of the Invention

The field of invention relates to fireman suit construction, and more particularly pertains to a new and improved fireman suit wherein the same is formed of a fire resistant material directed to freedom of movement of an individual utilizing the suit structure.

2. Description of the Prior Art

Fireman suits of various types utilized throughout the prior art are frequently made of a fire-resistant material such as Nomex (R) or Kelvar (R). Suit apparatus of the prior art is typically of a multi-piece construction and has not accommodated various movement requirements in a fireman type application requiring maximum mobility of the leg and arm joints in use. Examples of prior art fireman suit construction is exemplified in the U.S. Pat. No. 4,604,759 to Bowman, et al. wherein a fireman suit includes a jacket portion illustrating the multi-piece construction of the prior art.

U.S. Pat. No. 4,310,926 to Maroist sets forth a fireman suit of a unitary construction.

Accordingly, it may be appreciated that there continues to be a need for a new and improved fireman suit as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fireman suit construction now present in the prior art, the present invention provides a fireman suit wherein the same is arranged of a unitary organization formed with pleated joint portions throughout the leg and arm tubes to maximize freedom of movement of an individual utilizing the suit construction. As such, the general purpose of the present invention, which will be described subsequently in greater detail, is to provide a new and improved fireman suit which has all the advantages of the prior art fireman suit constructions and none of the disadvantages.

To attain this, the present invention provides a fireman suit formed as a fire-resistant shell including a torso portion formed with a medial longitudinally aligned zipper and a rear pleated portion arranged parallel and longitudinally aligned with the zipper directed through a rear surface of the torso portion. Each leg tube includes an accordion pleated leg conduit portion and a groin pleated accordion portion, with each arm tube including an accordion pleated elbow portion medially of each arm. A pouch container is arranged for mounting relative to the forward surface of the torso portion of the suit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fireman suit which has all the advantages of the prior art fireman suit constructions and none of the disadvantages.

It is another object of the present invention to provide a new and improved fireman suit which may be easily and efficiently manufactured and marketed.

It is a further object of the present invention to provide a new and improved fireman suit which is of a durable and reliable construction.

An even further object of the present invention is to provide a new and improved fireman suit which is susceptible of a low cost of manufacture with regard to both materials and labor, and which accordingly is then susceptible of low prices of sale to the consuming public, thereby making such fireman suits economically available to the buying public.

Still yet another object of the present invention is to provide a new and improved fireman suit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
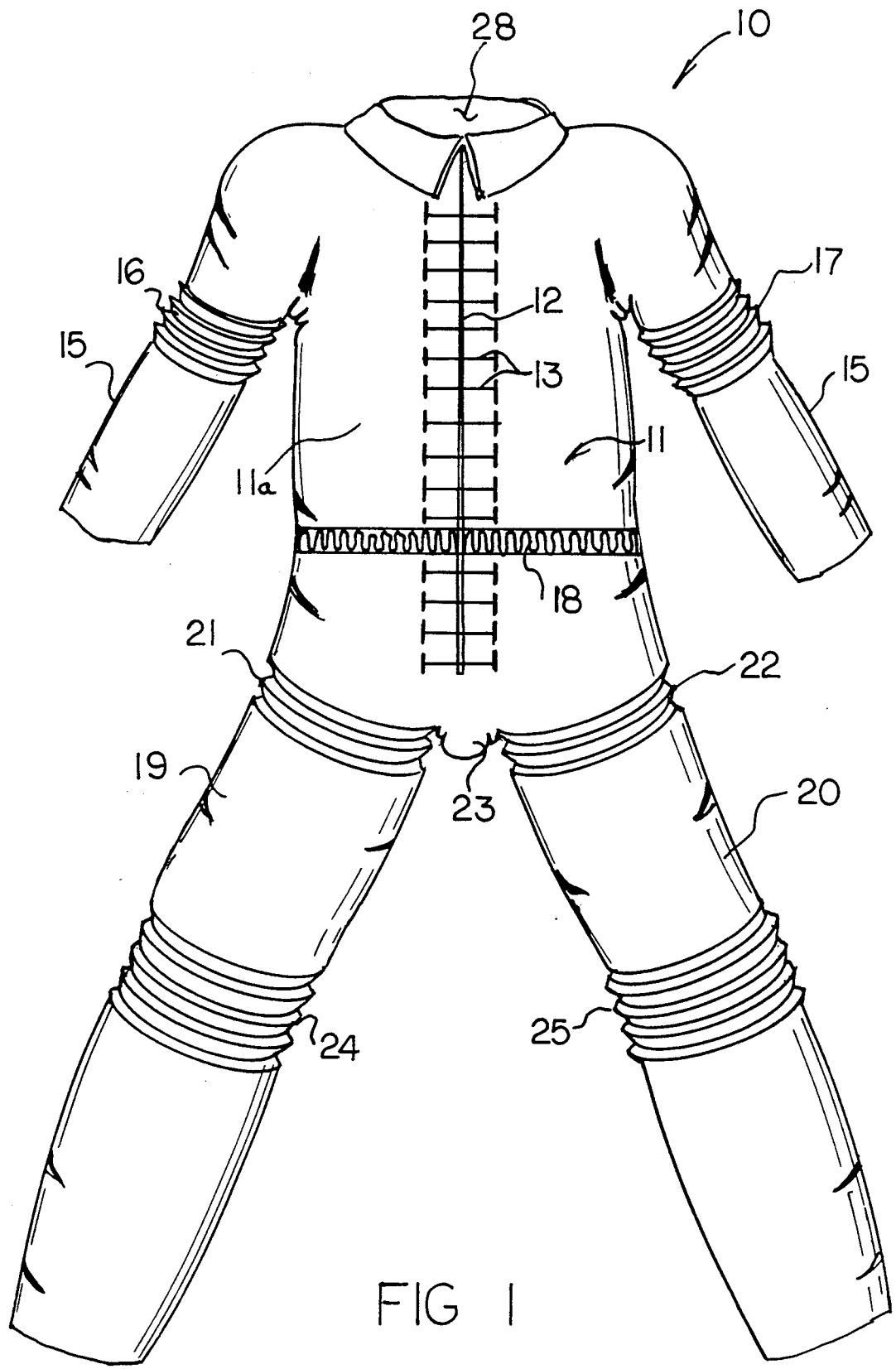
FIG. 1 is an orthographic frontal view of the invention.
Figure 2:
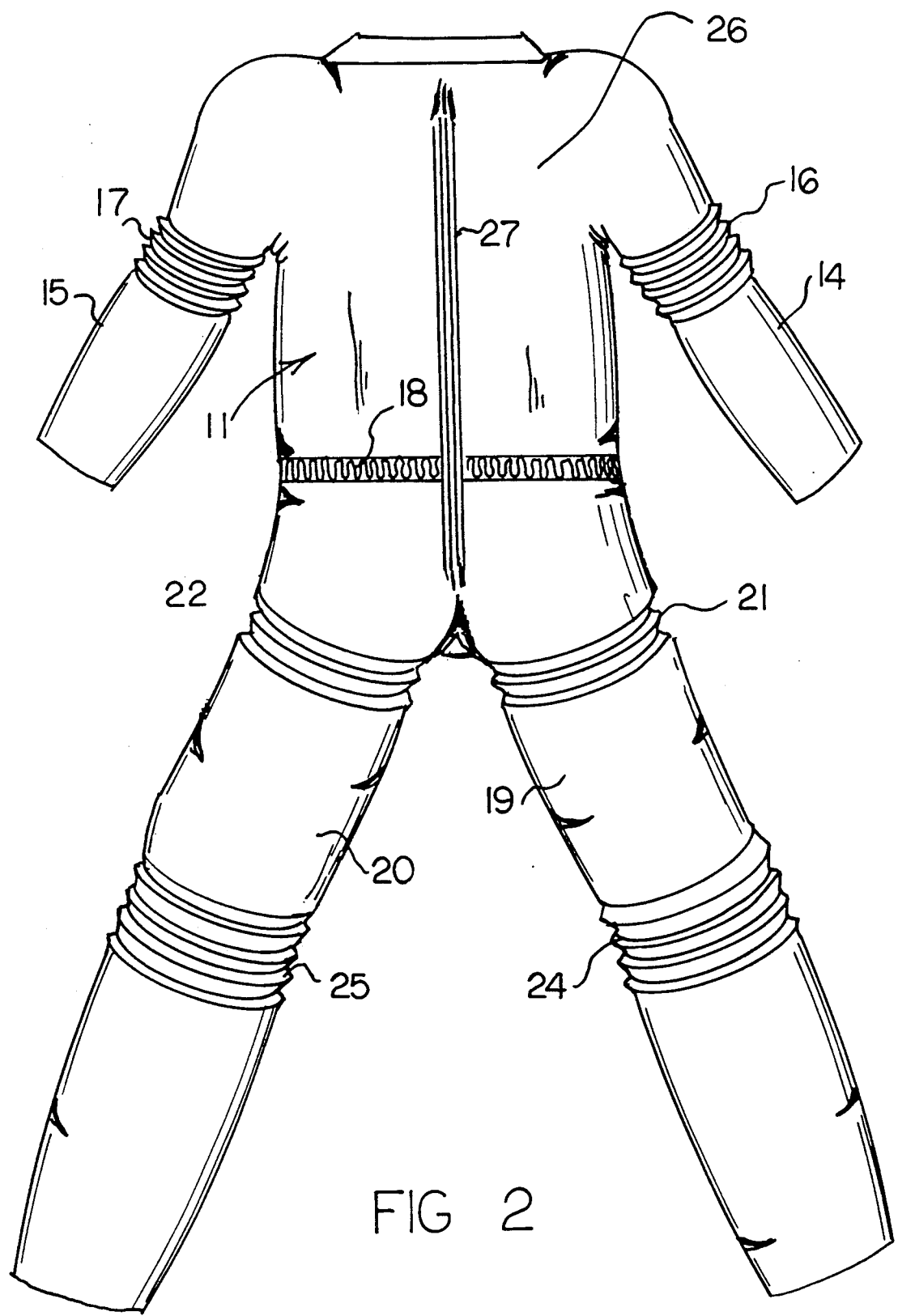
FIG. 2 is an orthographic rear view of the invention.

With reference now to the drawings, and in particular to FIGS. 1 to 7 thereof, a new and improved fireman suit embodying the principles and concepts of the present invention and generally designated by the reference numeral 10 will be described.

More specifically, the fireman suit 10 of the instant invention essentially comprises a unitary shell formed with a torso shell portion 11, including a frontal surface 11a and a torso rear surface 26. A zipper 12 is longitudinally directed through the frontal surface 11a medially of the frontal surface terminating in a spaced relationship relative to a groin portion defined by the intersection of the right and left leg tubes 19 and 20 directed downwardly from the torso shell 11. As illustrated, optional securement laces 13 may be orthogonally directed across the zipper 12 coextensively with the zipper. Arranged in a coextensive relationship relative to the zipper 12 is a longitudinal spinal plurality of pleats 27 (see FIG. 2) to accommodate mobility and activity of an individual utilizing the suit construction. A right and left arm tube 14 and 15 respectively is directed exteriorly of the shell and in communication therewith, wherein the respective right and left arm tubes include respective right and left accordion pleated elbow tube portions 16 and 17 positioned substantially medially of each arm tube for freedom of movement of an individual's arms within the arm tubes. An elastomeric torso band 18 is circumferentially directed about the torso shell 11 orthogonally oriented relative to the zipper 12 about a waist portion of the torso shell. The right and left leg tubes 19 and 20 include right and left accordion pleated tube portions 21 and 22 at the intersections of the leg tubes with the torso shell, wherein the leg tubes further includes respective right and left knee accordion pleated tube portions 24 and 25 positioned substantially medially of the respective right and left leg tubes, again in the interest of flexibility of movement of the various joints of an individual in utilization of the suit construction. A groin pocket 23 is provided at the groin portion of the torso shell medially of the right and left leg tubes, as illustrated. The neck opening 28 is defined at an upper distal end of the zipper, with the zipper directed into the neck opening 28 to enhance ease of access within the suit construction by a fireman and the like utilizing the suit construction.

Figure 3:
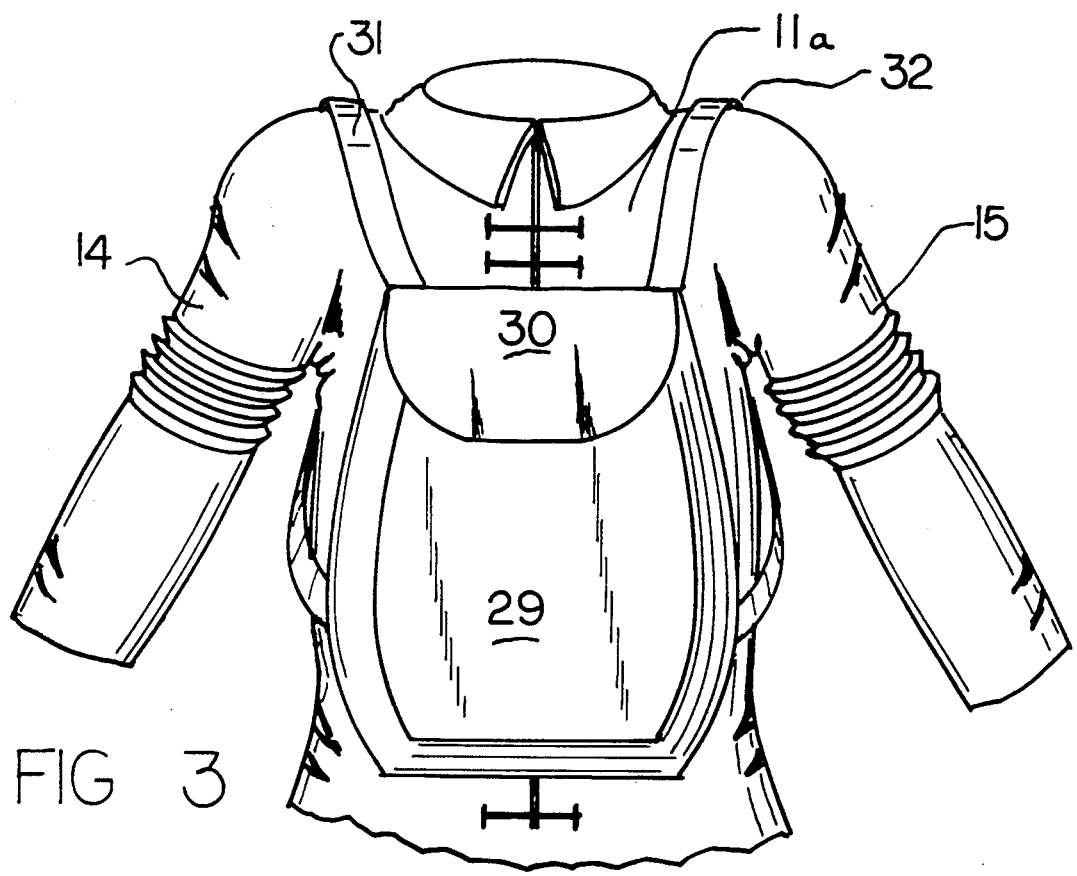
FIG. 3 is an orthographic frontal view of the invention, illustrating the use of a pouch container.
Figure 4:
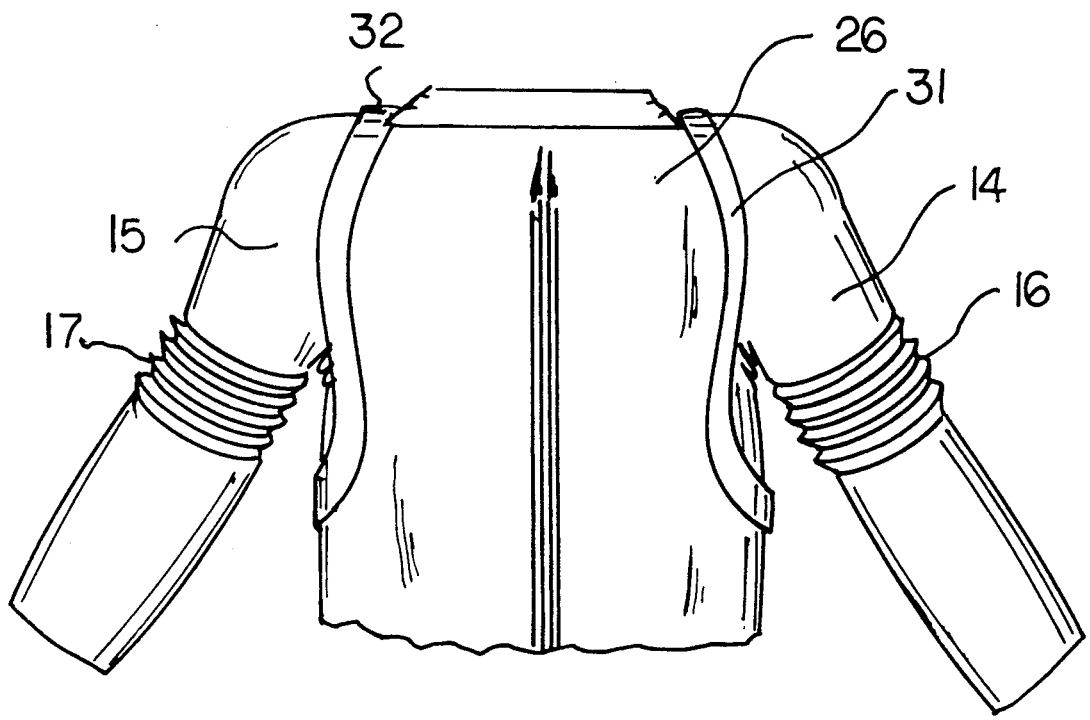
FIG. 4 is an orthographic rear view of the suit illustrating the mounting of the pouch container.

The FIGS. 3 and 4 illustrate the use of a flexible pouch container 29 arranged for mounting to the frontal surface 11a of the torso shell 11, to include a container flap 30. The container is arranged for the transport of various components, and even small children and the like as required. A first and second respective strap loop 31 and 32 that are mounted to respective right and left ends of an upper distal end of the pouch container 29 are looped about the shell and extend under the arm tubes of the respective right and left arm tubes and join the container in a spaced relationship to a bottom edge of the container to respective right and left sides of the container, as illustrated in the FIGS. 3 and 4.

Figure 5:
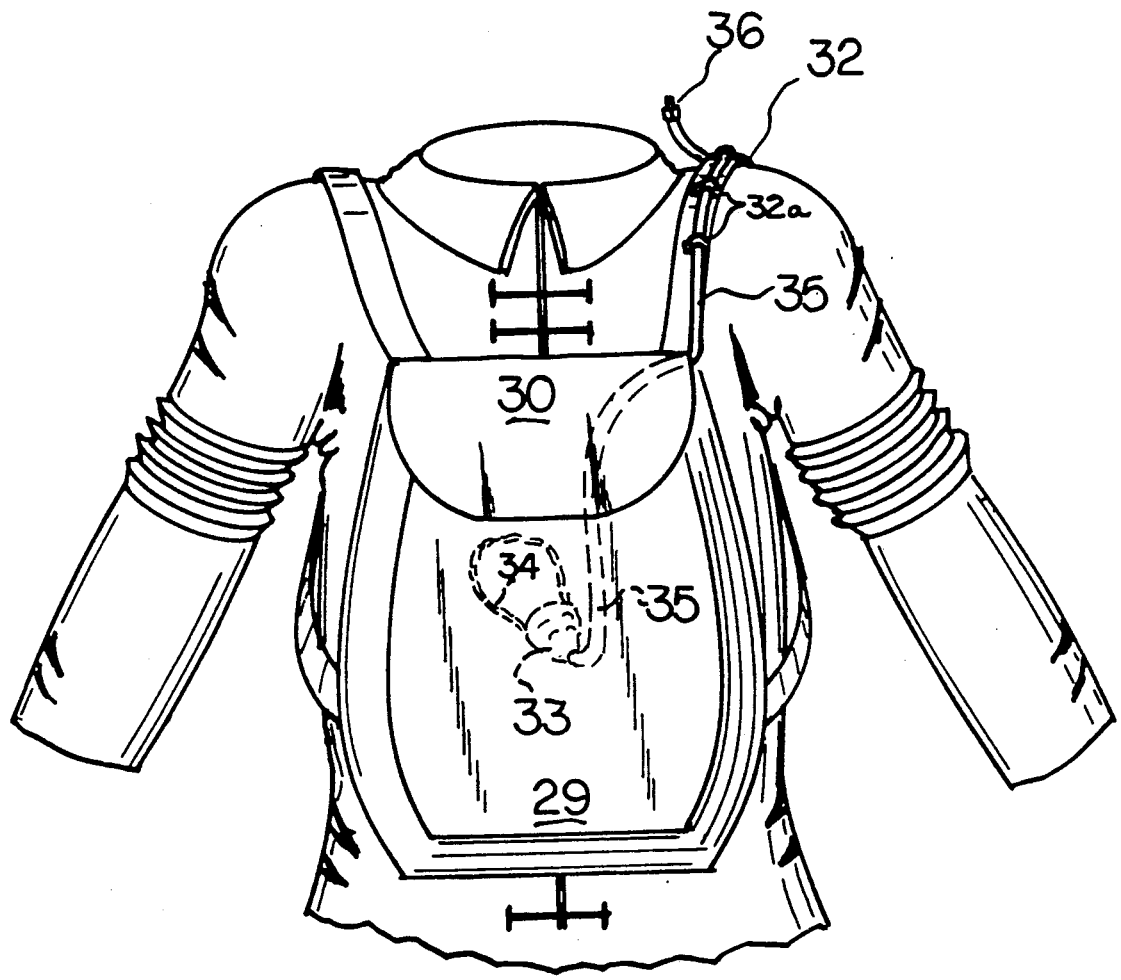
FIG. 5 is an orthographic frontal view of the pouch utilizing an oxygen mask contained therewithin.
Figures 6, 7:
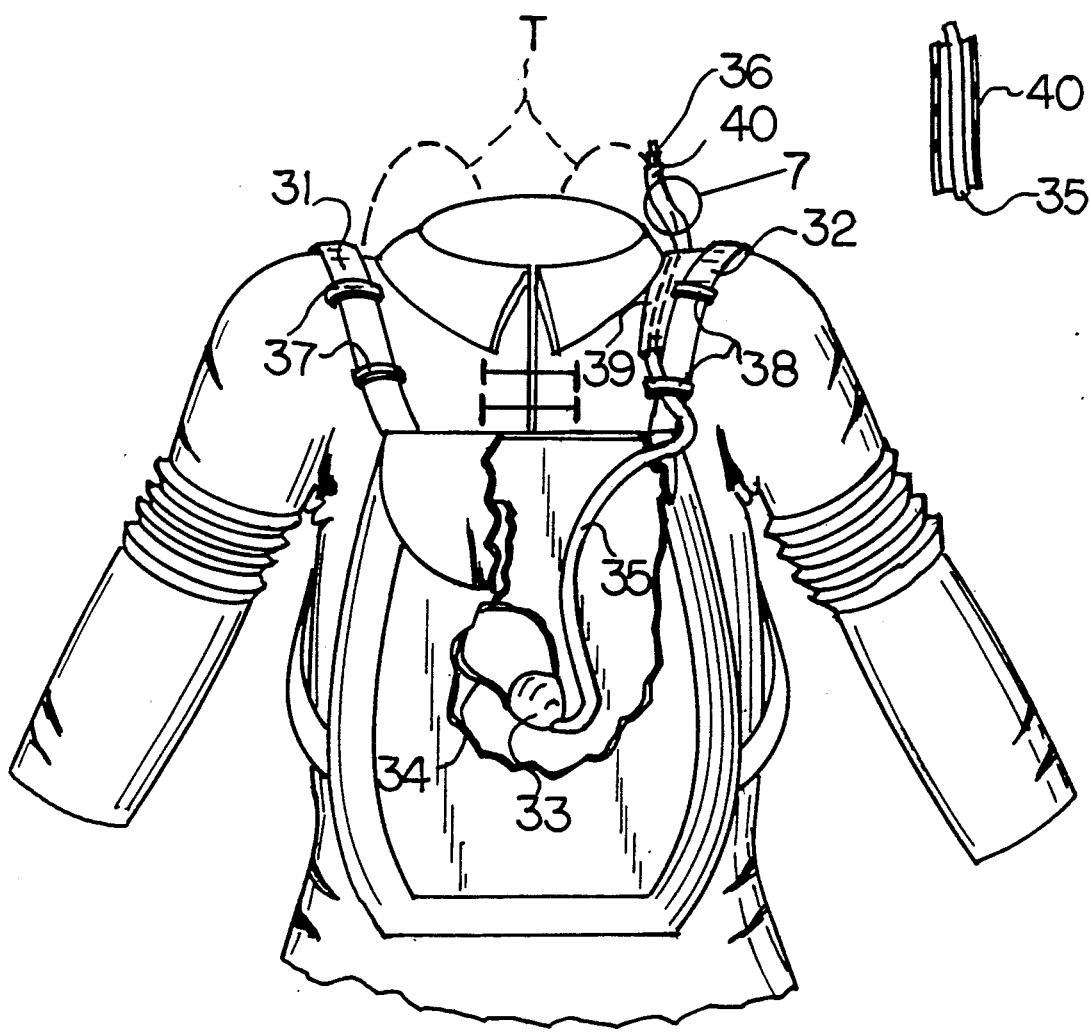
FIG. 6 is an orthographic frontal view of the suit of a modifying construction illustrating enhanced securement of safety in mounting of the pouch and oxygen mask apparatus.
FIG. 7 is a cross-sectional view of section 7 as set forth in FIG. 6.

The container, as illustrated in the FIGS. 5 and 6, is arranged to receive an air mask 33 for use by fireman formed with a securement band 34, typically of elastomeric construction, and pneumatic conduit 35 in pneumatic communication with the air mask 33. Pneumatic conduit 35, as illustrated in the FIG. 6, is directed into the covering sheath rear portion 39 that is in contiguous and adjacency relative to the second strap loop 32, with the pneumatic conduit 35 emerging therefrom into a covering sheath forward portion 40 to afford protection of the pneumatic conduit, wherein the covering sheaths 39 and 40 are formed of the fire-retardant type material such as Nomex (R) or Kelvar (R). A pneumatic conduit connector rear distal end 36 permits pneumatic communication of the pneumatic conduit 35 with air tanks "T", as illustrated in FIG. 6 for example, that may be secured by conventional means to the torso rear surface 26. It should be further noted that right and left securement loops 37 and 38 mounted to the torso frontal surface 11a are orthogonally directed across the respective first and second strap loops 31 and 32 to receive the strap loops 31 and 32 in a secured relationship relative to the suit construction.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fireman suit, comprising,
    a unitary shell, the unitary shell including a torso shell, the torso shell including a torso shell frontal surface and a torso shell rear surface, and
    the torso shell including a torso shell upper distal end and a torso shell lower distal end, with the torso shell upper distal end including a respective right and left arm tubes projecting exteriorly from the torso shell adjacent the torso shell upper distal end and medially between the torso shell frontal surface and the torso shell rear surface, and
    right and left leg tubes projecting downwardly relative to the torso shell medially between the torso shell frontal surface and the torso shell rear surface extending downwardly from the torso shell lower distal end, and an elongate zipper medially bisecting the torso shell frontal surface positioned between the right arm tube and the left arm tube, and a plurality of securement laces orthogonally directed across the zipper, and a neck opening directed medially through the torso shell upper distal end between the right arm tube and the left arm tube, with the zipper intersecting the neck opening, and the right arm tube including a right accordion pleated elbow tube portion oriented substantially medially of the right arm tube, and the left arm tube including a left accordion pleated elbow tube portion positioned substantially medially of the left arm tube, and a groin pocket projecting downwardly relative to the torso shell between the right leg tube and the left leg tube, the right leg tube including a right groin accordion pleated tube portion formed at an intersection of the right leg tube with the torso shell, and the left leg tube including a left groin accordion pleated tube portion formed at an intersection of the left leg tube with the torso shell.

2. A fireman suit as set forth in claim 1 including a right knee accordion pleated tube portion positioned substantially medially of the right leg tube, and a left knee accordion pleated tube portion positioned substantially medially of the left leg tube.

3. A fireman suit as set forth in claim 2 including an elastomeric torso band circumferentially directed about the torso shell orthogonally oriented relative to the zipper, and a plurality of longitudinal spinal pleats mounted medially of the torso shell rear surface arranged coextensive with the zipper.

4. A fireman suit as set forth in claim 3 including a flexible pouch container mounted in contiguous communication with the torso shell frontal surface, the pouch container including container flap pivotally mounted to an upper distal end of the container, and a first strap loop mounted adjacent a right distal end of the pouch container extending about the upper distal end of the torso shell and secured to the pouch container spaced from a lower distal end of the pouch container, and a second strap loop directed over the upper distal end of the torso shell between the neck opening and the left arm tube and mounted to the pouch container at the upper distal end of the pouch container and to the pouch container spaced below the distal end of the pouch container.

5. A fireman suit as set forth in claim 4 wherein the first strap loop and the second strap loop are directed within respective right and left securement loops fixedly mounted to the torso shell, wherein the right loops are positioned between the right arm tube and the neck opening and the left securement loops are positioned between the left arm tube and the neck opening, and wherein the right securement loops and the left securement loops are orthogonally directed over the respective first and second strap loops, and an air mask positioned within the pouch container, the air mask including a securement band, and a pneumatic conduit in communication with the air mask, the pneumatic conduit directed exteriorly of the pouch container, and a covering sheath rear portion fixedly mounted to the torso shell adjacent the second strap loop, with the pneumatic conduit directed between the covering sheath rear portion and the torso shell, and a covering sheath forward portion mounted to the covering sheath rear portion, with the pneumatic conduit directed through the covering sheath rear portion and the covering sheath forward portion, and the pneumatic conduit including a pneumatic conduit connector rear distal end positioned exteriorly of the covering sheath forward portion, and air tanks mounted to the torso shell rear surface, with the pneumatic conduit connector rear distal end arranged for pneumatic association with the air tanks, and the covering sheath rear portion and the covering sheath forward portion formed of a fire resistant material, with the torso shell, the right arm tube, the left arm tube, the right leg tube, and the left leg tube formed of the fire resistant material.

* * * * *